(12) United States Patent
Aandewiel et al.

(10) Patent No.: US 6,783,451 B2
(45) Date of Patent: Aug. 31, 2004

(54) METHOD AND APPARATUS FOR REMOVING FAECAL MATTER FROM SLAUGHTERED POULTRY SUSPENDED BY THE LEGS AND FOR CLEANING THE POULTRY

(75) Inventors: Leendert Aandewiel, Aa Oostzaan (NL); Simon Bakker, Aa Oostzaan (NL); Jacob Jan Van Craaikamp, Aa Oostzaan (NL); Wilhelmus Johannes Casper Heemskerk, Aa Oostzaan (NL); Antonius Jozef Veraart, Aa Oostzaan (NL)

(73) Assignee: Meyn Food Processing Technology, Oostzaan (NL)

( * ) Notice: Subject to any disclaimer, the term of this patent is extended or adjusted under 35 U.S.C. 154(b) by 0 days.

(21) Appl. No.: 10/271,356

(22) Filed: Oct. 15, 2002

(65) Prior Publication Data

US 2003/0092372 A1 May 15, 2003

(30) Foreign Application Priority Data

Oct. 16, 2001  (NL) ............................................. 1019179

(51) Int. Cl.$^7$ ............................................. A22L 17/08
(52) U.S. Cl. ........................... 452/173; 452/89; 452/75; 452/106
(58) Field of Search .............................. 452/67, 74, 89, 452/90, 109, 120, 122, 123, 173, 75, 91, 106

(56) References Cited

U.S. PATENT DOCUMENTS

| | | | | |
|---|---|---|---|---|
| 3,958,303 A | * | 5/1976 | Scheier et al. .............. | 452/109 |
| 3,969,790 A | * | 7/1976 | Smorenburg .................. | 452/75 |
| 4,001,915 A | * | 1/1977 | Prince et al. | |
| 4,860,403 A | * | 8/1989 | Webb et al. | |
| 4,868,950 A | * | 9/1989 | Harben, Jr. .................. | 452/77 |
| 4,944,068 A | * | 7/1990 | Covell, III .................... | 452/80 |
| 4,996,741 A | * | 3/1991 | Covell, III .................... | 452/74 |
| 5,045,021 A | * | 9/1991 | Borup ......................... | 452/74 |
| 5,178,890 A | * | 1/1993 | van den Nieuwelaar et al. ........ | 426/332 |
| 5,482,503 A | * | 1/1996 | Scott et al. .................. | 452/173 |
| 5,651,730 A | * | 7/1997 | McGinnis et al. ............. | 452/74 |
| 5,888,132 A | * | 3/1999 | Burnett ....................... | 452/141 |
| 5,980,375 A | * | 11/1999 | Anderson et al. ............. | 452/77 |
| 6,006,659 A | * | 12/1999 | Rosenthal .................... | 99/451 |
| 6,142,861 A | * | 11/2000 | Buhot et al. .................. | 452/78 |
| 6,220,952 B1 | * | 4/2001 | Taylor, Sr. et al. ......... | 452/173 |
| 6,547,659 B1 | * | 4/2003 | Adachi et al. ............... | 452/173 |
| 2001/0034200 A1 | * | 10/2001 | Clark ......................... | 452/106 |

FOREIGN PATENT DOCUMENTS

EP          0041717       * 12/1981

* cited by examiner

Primary Examiner—Robert P. Swiatek
Assistant Examiner—David J. Parsley
(74) Attorney, Agent, or Firm—Dority & Manning

(57) ABSTRACT

The invention relates to a method and apparatus for removing faecal matter from slaughtered poultry suspended by the legs, wherein the poultry, after having been cut for bleeding, is scalded to soften the feathers of the poultry, and after having been scalded is plucked and eviscerated to provide fresh defeathered slaughtered poultry, wherein also the removal of faecal matter takes place by prior to evisceration removing not yet unloaded faecal matter from the poultry by applying a pressure load to the abdominal cavity of the poultry, and simultaneously or subsequently spraying away the faecal matter squeezed out of the poultry with water and/or air.

19 Claims, 7 Drawing Sheets

METHOD AND APPARATUS FOR REMOVING FAECAL MATTER FROM SLAUGHTERED POULTRY SUSPENDED BY THE LEGS AND FOR CLEANING THE POULTRY

BACKGROUND

The invention relates to a method and apparatus for removing faecal matter from slaughtered poultry suspended by the legs and for cleaning said poultry.

An important objective when slaughtering and processing poultry in, for example, poultry processing plants is the maintenance of hygiene. This hygiene is critical because during the processing of the slaughtered poultry faecal matter is unloaded, which leads to the contamination of the poultry. It has even been shown that faecal matter from one bird in an automated processing line can lead to the contamination of several hundreds of subsequent birds.

Over the years many proposals have been made in an effort to combat such faecal contamination.

A known method of avoiding faecal contamination is to terminate feeding for an extended period of time so that the intestines of the poultry will eventually be vacated. However, this involves several drawbacks. For one thing, the liver of the poultry initially continues to produce bile that will not be used up anymore. This causes the gall-bladder to be stretched increasingly taut, which may increase the risk that when the intestines are being removed, the poultry will become tainted from the bile. In addition, no feeding will have a negative effect on the weight of the poultry. The termination of feeding further leads to the appendix vacating into the colon, so that the faeces are relatively more heavily contaminated than usual, putting a greater strain on hygiene.

Yet another drawback of terminating feeding is that the length of time for which feeding is terminated is difficult to control for each individual chick. This is because termination of feeding starts for a whole batch of chicks at a predetermined moment, while several hours may pass between slaughtering the first chick and the last chick. Apart from producing unpleasant situations for the animals before slaughter, it also increases the number of chickens already dead before slaughter. Termination of feeding further increases stress, which has a negative effect on the quality of the meat.

It has also been proposed to use feed supplements in order to combat the number of bacteria in the excrement. However, a problem with this method is that not all bacteria can be combated equally effectively in this manner.

Another proposal is to supplement the drinking water of the poultry with lactic acid during the period of feed termination. However, this merely results in combating contamination via the gullet and does not effectively combat contamination via the faecal matter.

Yet another proposal is to wash the poultry during bleeding. However, this method also has drawbacks preventing its application. Washing poultry during bleeding is undesirable because the resulting blood/water mixture leads to extra costs for purification (if blood is discharged with the water) or recycling (if water is discharged with the blood).

U.S. Pat. No. 3,137,031 makes the proposal of, prior to evisceration, flushing the lower intestines of the poultry with water while simultaneously evacuating the lower intestines by pneumatic suction. However, this evacuation by suction can easily cause damage to the intestines.

A method of removing faecal matter from slaughtered poultry suspended by the legs in accordance with the preamble of the main claim is known from U.S. Pat. No. 4,739,539. The drawback of this known method is that the intestines are subjected to pressure after the poultry has been scalded and plucked. This results in a continued contamination both during the scalding phase and in the plucking phase of the poultry. A further problem is that the apparatus known from this patent exerts pressure to the breast and the back of the poultry simultaneously by means of two components of the apparatus, each of which rotates about an axis. The result is that this operation takes very little time, which practice has shown to be insufficient to effectively remove the faecal matter from the poultry.

U.S. Pat. No. 4,876,767 proposes an apparatus for evacuating the intestines of the poultry by suction after scalding and plucking. This means that bacteria present on the skin and feathers on the outside of the poultry causes contamination of the scalding water and forms a considerable risk for cross-contaminating the remaining poultry. A further drawback is that, in the stage of evacuation by suction, considerable contamination has already occurred due to the faecal matter that may have unloaded spontaneously during bleeding, during scalding and during plucking. A disadvantage is also that metering the applied vacuum is difficult to the extent that an unacceptable amount of damage to the intestines is incurred. In addition, the suction organ used is susceptible to clogging.

A method and apparatus as proposed in U.S. Pat. No. 4,876,767 is also known from U.S. Pat. No. 4,889,421.

In WO 96/37110 (EP-A-910 249), it is proposed to combat contamination by faecal matter by closing off the anus of the poultry by means of a plug. The use of such a plug or stop is process-technically difficult when applying the customary process of removing the vent. Moreover, this may still cause cross-contamination of successive poultry.

SUMMARY

It is a principal object of the invention to provide a method and apparatus for removing faecal matter from slaughtered poultry suspended by the legs in which the above-mentioned drawbacks are reduced or absent. Additional objects and advantages of the invention will be set forth in part in the following description, or may be obvious from the description, or may be learned through practice of the invention.

To this end, the method for removing faecal matter from slaughtered poultry suspended by the legs is in accordance to the invention characterized in that the pressure to the abdominal cavity of the poultry is applied prior to scalding.

According to the invention, this method may, for example, be conveniently carried out in an apparatus for removing faecal matter from poultry suspended by the legs from an overhead transporter, comprising a presser organ for applying a pressure load to the abdominal cavity of the poultry, as well as a scalding installation, and succeeding the scalding installation, a plucking installation, which is characterized in that in the process direction of the installation, the presser organ precedes the scalding installation.

In order to enhance the effectiveness of squeezing the faecal matter out, the pressure load is, after its application and during its continued application on the abdominal cavity, moved in the direction of the anus of the poultry.

To this end, the effective squeezing out of the faecal matter may be conveniently realized in an apparatus characterized in that the presser organ is a pressure lever that is pivotally suspended from an axis, having a free end for placing against the abdominal cavity of the poultry and in that with an increase in pressure load, the pressure lever moves in the direction of the anus of the poultry. When a high processing rate of birds per hour is required in processing slaughtered poultry on an industrial scale, it is advantageous for the poultry to stay positioned in a suspended vertical position during the application of the pressure load.

It is further desirable that, during the application of the pressure load, the anus of the poultry is simultaneously sprayed with water and/or air. To this end, the apparatus is preferably provided with a spray nozzle directed at the anus.

In another aspect of the invention, it is desirable that after the application of the pressure load but before scalding, the poultry in its entirety is subjected to a washing operation.

To this end, the apparatus is preferably embodied such that, viewed in the process direction, after the presser organ, a spraying chamber is provided for the external cleaning of the poultry. In this manner, the poultry from which the faecal matter has already been removed receives an effective external cleaning by means of thorough flushing, preferably with warm water. This largely removes the external fouling and contamination so as to greatly reduce fouling and contamination in later phases of processing. This is especially important with respect to the scalding water in which the poultry is placed to soften the feathers of the poultry prior to plucking.

For economical reasons it is desirable for the spraying chamber to be incorporated in a recirculation system for the spraying water. The hot water output being sprayed over the poultry may amount to several liters per animal, which makes collecting, filtering, decontamination and re-use of the water economically interesting, while limiting the external harm to the environment. Desirably, the recirculation system comprises a filtering sieve. For the decontamination, the recirculation system advantageously comprises a pasteurizer. If desired, this may be combined with an anodic oxidation, possibly complemented by an ultrasonic treatment of the water. With a view to economic water and energy consumption, it is further desirable that the scalding installation and/or the plucking installation is also incorporated in the recirculation system for the spraying water.

In a completely different aspect of the invention, it is proposed that before or during the application of the pressure load on the abdominal cavity of the poultry, the poultry may be connected to an electrical stimulation system.

Desirably, the electrical stimulation system is adjusted with predetermined settings for voltage, type of signal, frequency and duration of the signal to be emitted by the system. This electrical stimulation system contributes to the spontaneous unloading of the faecal matter. An additional important advantage is that the electrical stimulation provided by this system benefits the tenderness of the meat of the poultry.

Below the invention will be briefly elucidated with reference to a schematic exemplary embodiment based on the appended drawing.

BRIEF DESCRIPTION OF THE DRAWINGS

Identical reference numbers refer to similar parts.

DESCRIPTION

Figure 1:
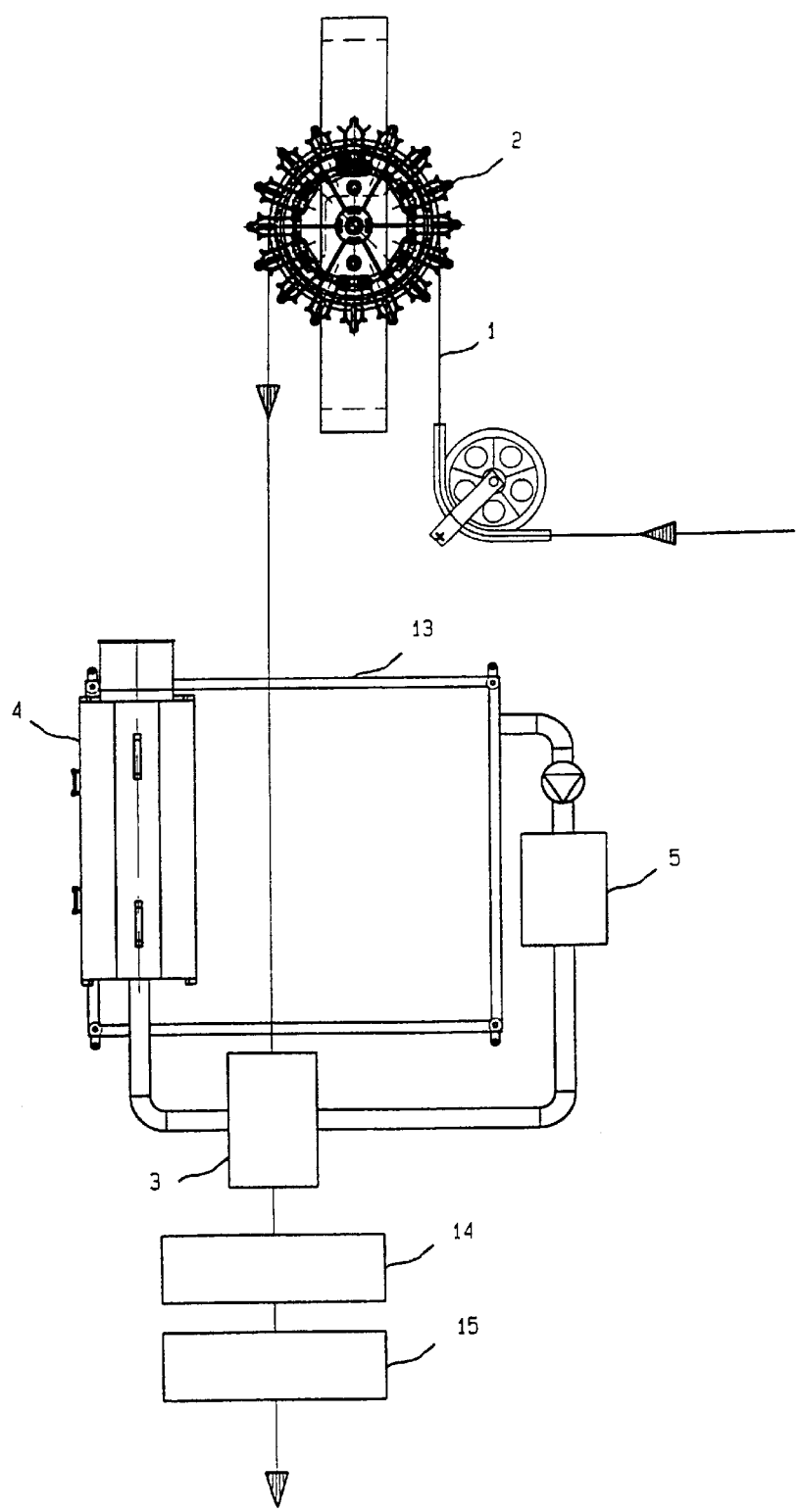
In FIG. 1 a section of a processing line of slaughtered poultry.

Reference will now be made in detail to various embodiments of the invention, examples of which are shown in the drawings. Each embodiment is provided by way of explanation of the invention, and not as a limitation of the invention. It is intended that the invention include modifications and variations to the embodiments shown and described herein.

FIG. 1 shows a section of a processing apparatus for slaughtered poultry, in which the poultry suspended from an overhead conveyor 1 is guided past a circular presser 2 in which the faecal matter is removed from the poultry. After the circular presser 2, the poultry suspended by the legs proceeds to a spraying chamber 3, where the poultry undergoes external cleaning. The waste water from this spraying chamber 3 is in a recirculation system in succession conducted through a filtering sieve 4 or another suitable filter placed in a collecting tank 13, and then through a pasteurizer 5 for the decontamination of the water, before the same is returned to the spraying chamber 3. After the poultry has passed through the spraying chamber 3, it undergoes further processing in a scalding installation 14 and a plucking installation 15.

The spraying chamber 3, as well as the scalding installation 14 and the plucking installation 15, use water that can circulate through the apparatus according to the invention in various ways. Several such possibilities are shown schematically in the FIGS. 3A to 3E.

Figure 3A:
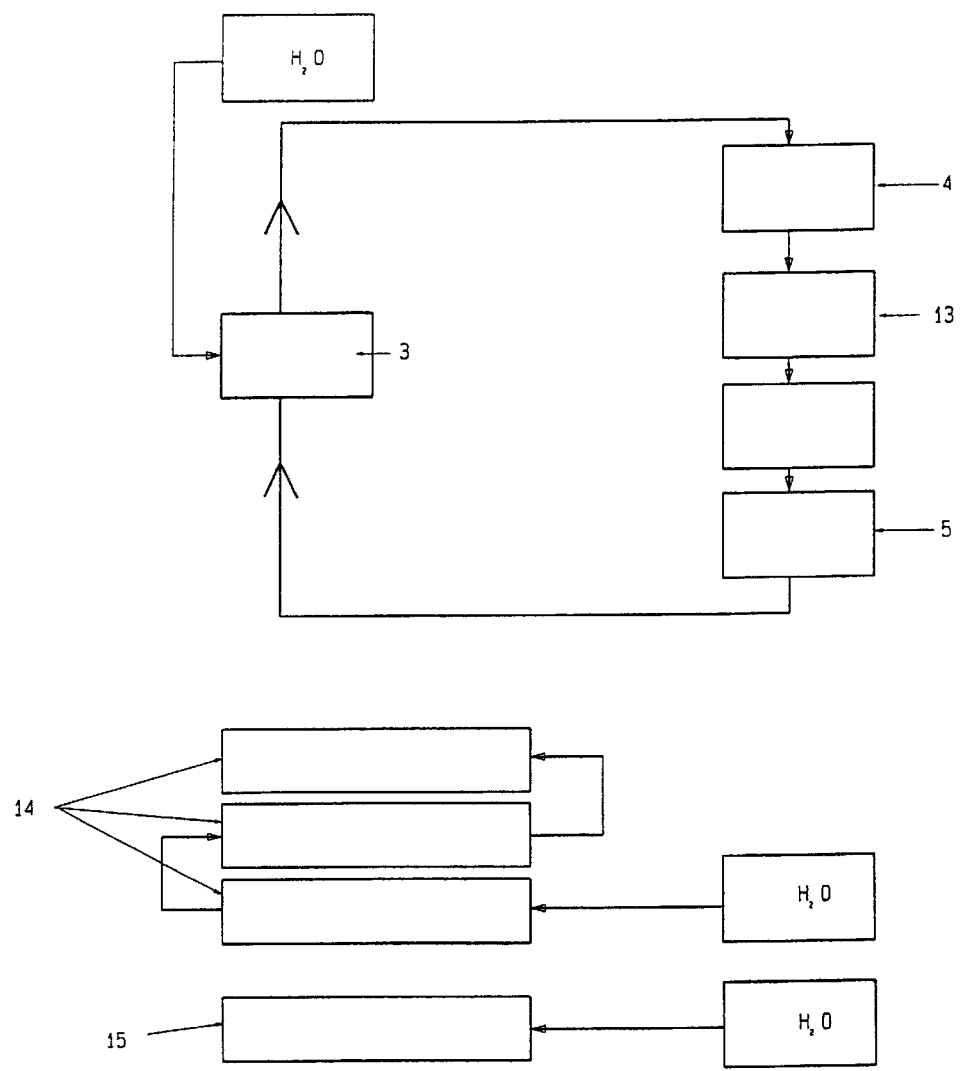

FIG. 3A shows the application of a separate water management in the scalding installation 14, in the plucking installation 15 and in the circulation cycle of the spraying chamber 3. The FIGS. 3B to 3E show variants with which it is possible to economise on the water and energy consumption.

Figure 3B:
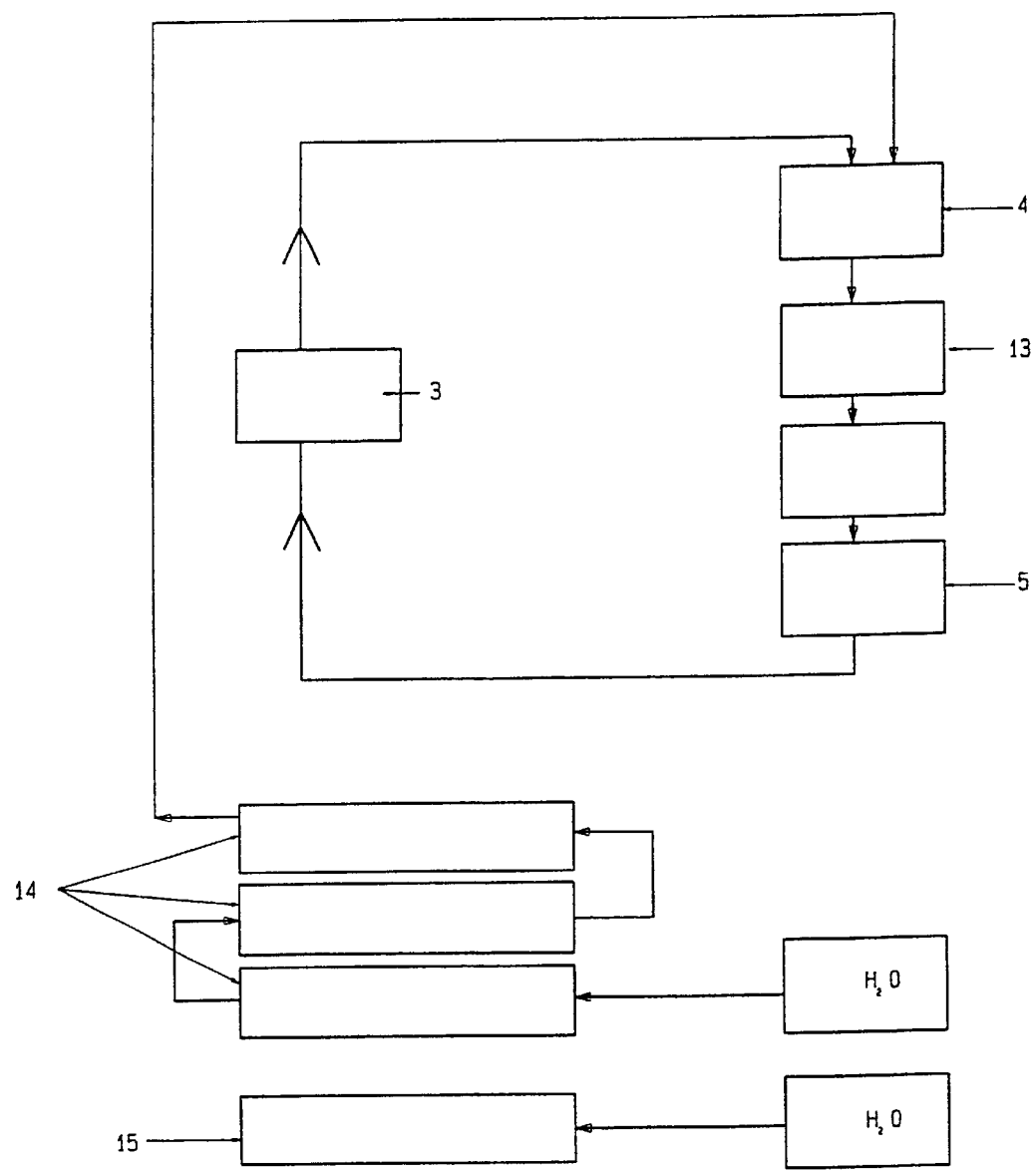

FIG. 3B shows a circulation system in which water suppletion from the scalding installation 14 to the circulation system of the spraying chamber 3 takes place. Suppletion from the scalding installation 14 takes place via the filter sieve 4 and the pasteurizer 5 before this water reaches the spraying chamber 3. In this embodiment, the plucking installation 15 has a separate water management.

Figure 3C:
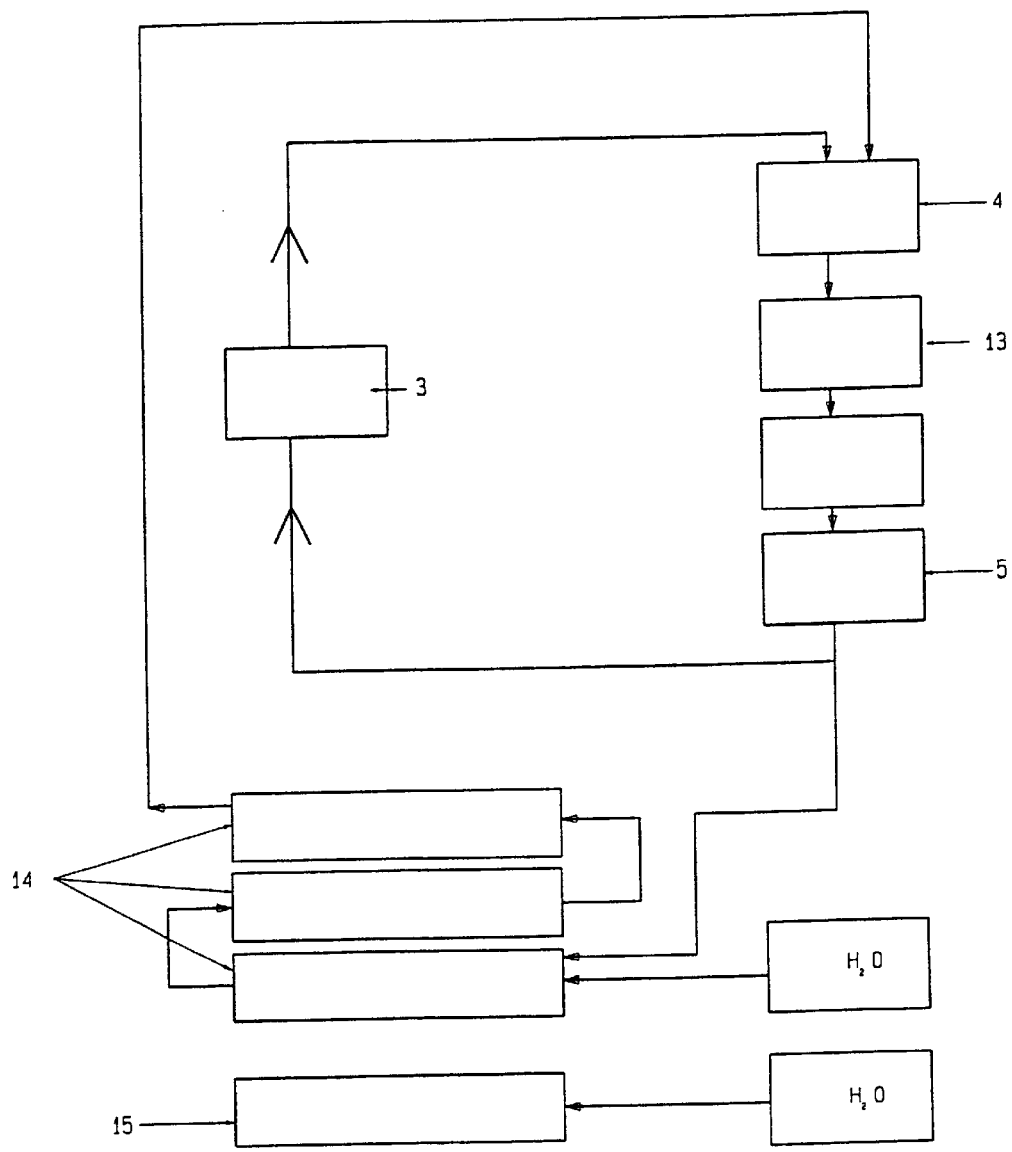

FIG. 3C shows the water management of the scalding installation 14 to be integrated with the spraying chamber 3, comparable with FIG. 3B. In this embodiment, the scalding installation 14 has a water supply from the pasteurizer 5.

Figure 3D:
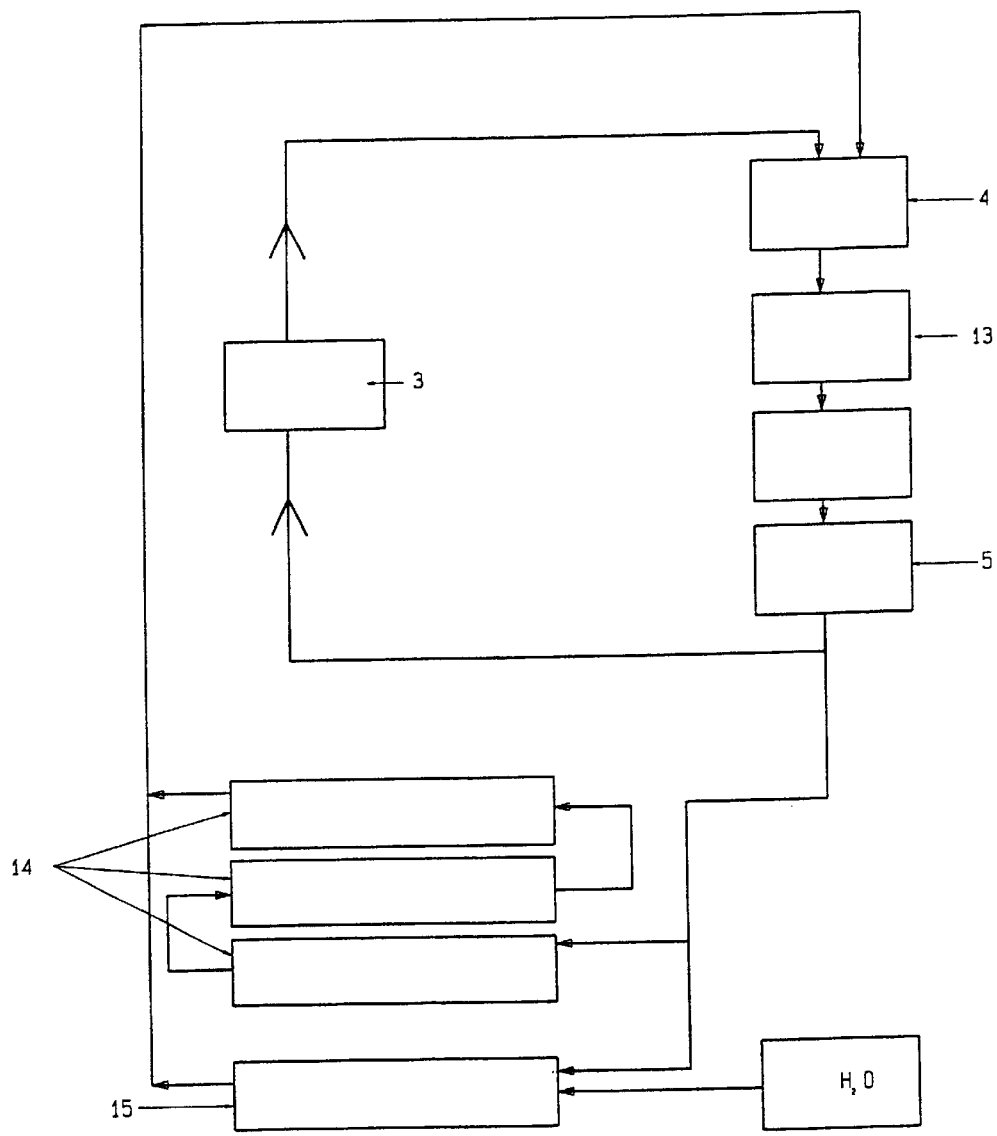

FIG. 3D shows the spraying chamber 3, the scalding installation 14 and the plucking installation 15 having a fully integrated water management. This provides the most economical water and energy use.

Figure 3E:
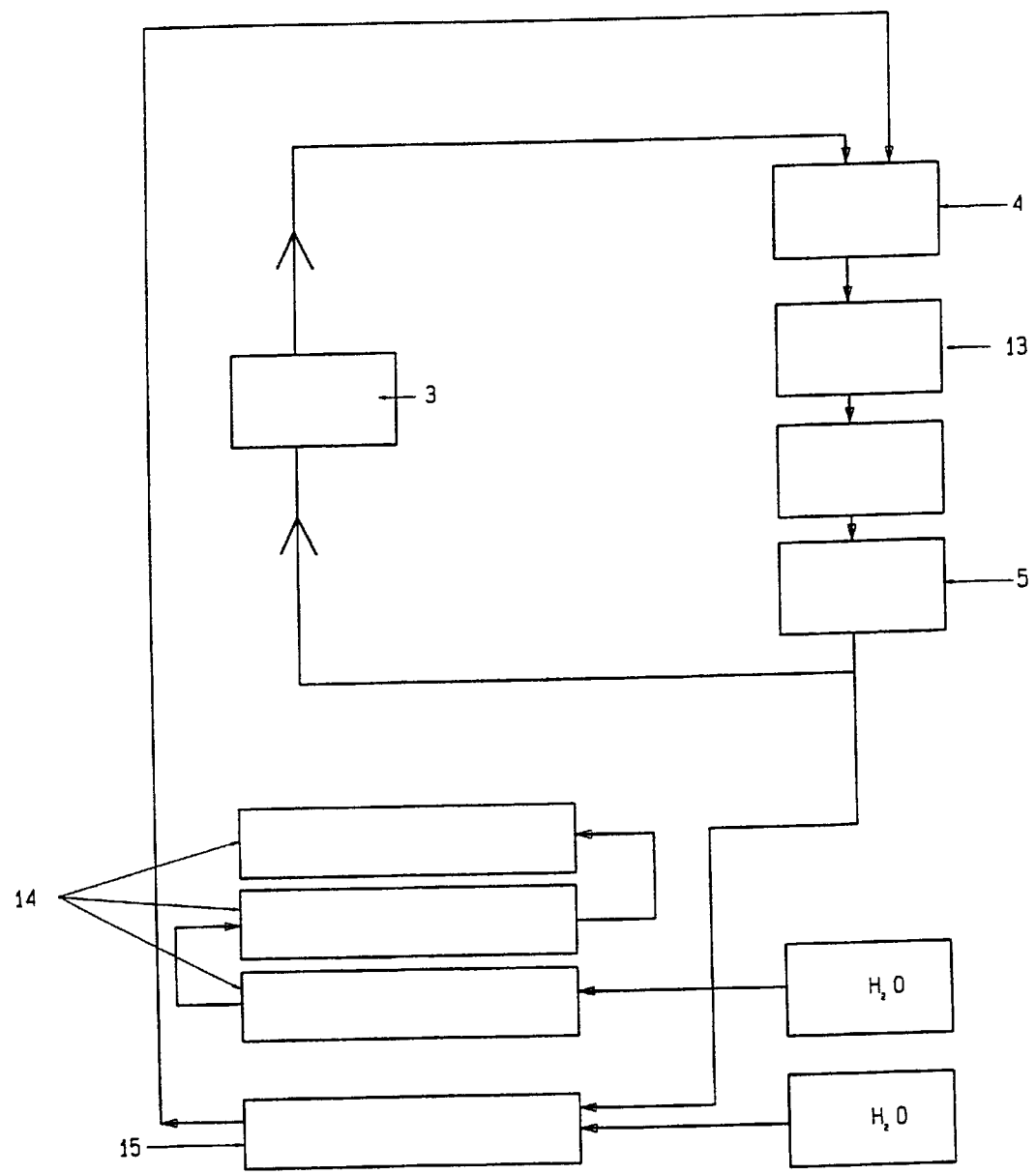

FIG. 3E shows another water circulation system in which the water supply of the spraying chamber 3 is integrated with the plucking installation 15.

Figure 2:
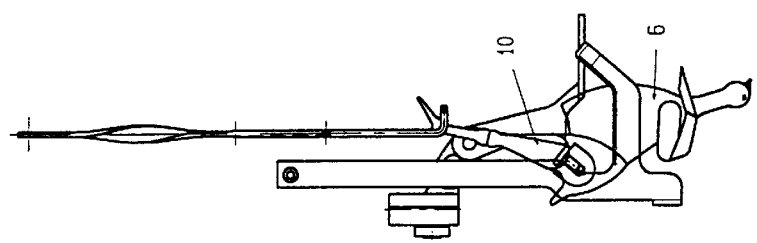
In FIGS. 2A, B and C, various stages of removing faecal matter from the poultry in an apparatus according to the invention; and In FIGS. 3A to 3E, schematic illustrations of a number of variations of the recirculation of water used in the apparatus according to the invention.
Figure 2:
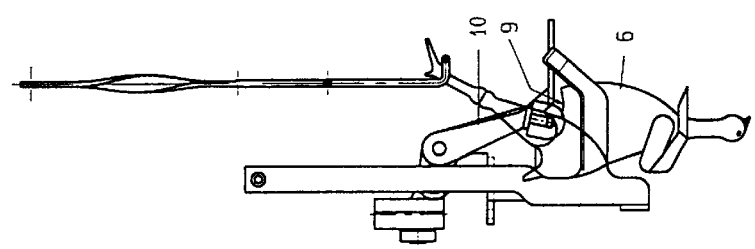
Figure 2:
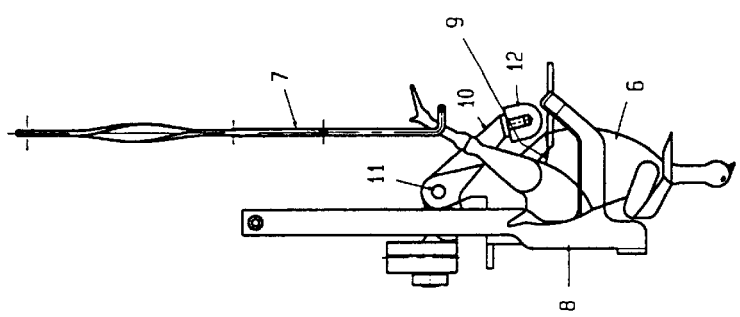

With reference to FIGS. 2A, B and C, a schematic illustration is shown of one single bird 6 suspended from a hook 7, which is transported by the overhead conveyor 1 past the circular presser 2. In this circular presser 2, the bird 6 is dorsally supported by a support organ 8. At the side of the poultry's 6 abdominal cavity 9, a presser organ is provided in the form of a presser lever 10, which is pivotally suspended around an axis 11. The presser lever 10 has a free end 12 which, as shown in FIG. 2B, is placed against the abdominal cavity 9 of the poultry 6 for squeezing out the still unloaded faecal matter from the poultry 6. Observing the FIGS. 2B and 2C, it can be seen that with the further increase of the pressure load exerted by the pressure lever 10, the free end 12 moves in the direction of the anus of the poultry 6.

Although not shown in the figures but for the person skilled in the art completely clear, a further preferable provision is spraying devices that are directed at the anus of the poultry 6 for immediately flushing away the squeezed out faecal matter so that there is no opportunity for this faecal matter to taint the exterior of the poultry 6.

A further aspect of the invention proposes that before or during the activity of the pressure lever 10, the poultry 6 be connected to an electrical stimulation system to stimulate the unloading of the faecal matter.

It is obvious to the person skilled in the art that within the frame of the invention many variations are conceivable and the above explanation merely serves to avoid any possible ambiguities in the appended claims.

Consequently, the protective scope merited by the invention is determined exclusively by the claims.

What is claimed is:

1. A method for removing faecal matter from suspended slaughtered poultry, comprising:

cutting the poultry for bleeding;

scalding the poultry to soften feathers prior to plucking the feathers;

eviscerating the poultry; and prior to said scalding and said eviscerating, removing faecal matter from the poultry by applying continuously a constant or variable pressure load to the abdominal cavity of the poultry while the poultry is supported by a support organ that is disposed to oppose the pressure load and simultaneously or subsequently spraying away the faecal matter squeezed out of the poultry by the pressure load.

2. The method as in claim 1, further comprising moving the pressure load during its application to the abdominal cavity in a direction towards the anus of the poultry.

3. The method as in claim 1, further comprising suspending the poultry by its legs and maintaining the suspended poultry in a generally vertical position during application of the pressure load.

4. The method as in claim 1, further comprising spraying the anus of the poultry with water or air simultaneously with applying the pressure load to the abdominal cavity of the poultry.

5. The method as in claim 1, further comprising washing the entirety of the suspended poultry after said application of the pressure load and before said scalding.

6. The method as in claim 1, further comprising connecting the poultry to an electrical stimulation system to stimulate unloading of the faecal matter before or during said application of the pressure load on the abdominal cavity of the poultry.

7. The method as in claim 6, further comprising adjusting any combination of voltage, type of signal, frequency, and duration of signal emitted by the electrical stimulation system to stimulate unloading of the faecal matter.

8. An automated apparatus for removing faecal matter from slaughtered poultry, comprising:

an overhead conveyor from which the poultry is suspended, said conveyor transporting the suspended poultry in a processing direction;

a scalding installation;

a plucking installation succeeding said scalding installation in said processing direction; and an automated presser installation preceding said scalding installation, said presser installation further comprising a support organ disposed for supporting the poultry and a presser organ disposed so as to move against and press the abdominal cavity of the suspended poultry between said support organ and said presser organ as the poultry is conveyed through said presser installation by said conveyor;

said support organ being configured and disposed in use to contact and underlie the portion of the poultry's body in a region opposite the abdominal cavity.

9. The apparatus as in claim 8, wherein said presser organ comprises a pressure lever pivotally suspended from an axis and having a free end disposed for pressing against the abdominal cavity of the poultry.

10. The apparatus as in claim 9, wherein for pressing against the abdominal cavity of the poultry, the pressure lever is movable from a start position towards the anus of the suspended poultry.

11. The apparatus as in claim 8, further comprising a spraying device positioned so as to spray the anus of the suspended poultry.

12. The apparatus as in claim 11, wherein said spraying device is disposed relative to said presser installation so as to spray the poultry as the presser organ presses against the abdominal cavity of the poultry.

13. The apparatus as in claim 11, wherein said spraying device is disposed relative to said presser installation so as to spray the poultry generally immediately after the presser organ has completed pressing against the abdominal cavity of the poultry.

14. The apparatus as in claim 8, further comprising a spraying chamber disposed after said presser organ in said processing direction to externally clean the poultry.

15. The apparatus as in claim 14, further comprising a water recirculation system, said spraying chamber in communication with said recirculation system and utilizing recirculated water for spraying the poultry.

16. The apparatus as in claim 15, wherein said recirculation system comprises a filtering sieve.

17. The apparatus as in claim 15, wherein said recirculation system comprises a pasteurizer.

18. The apparatus as in claim 15, wherein said scalding installation is in communication with said recirculation system and uses recirculated water for scalding the poultry.

19. The apparatus as in claim 15, wherein said plucking installation is in communication with said recirculation system and used recirculated water in a plucking operation.

* * * * *